United States Patent [19]
Abe et al.

[11] Patent Number: 5,332,984
[45] Date of Patent: Jul. 26, 1994

[54] DIELECTRIC RESONATOR OR FILTER FOR MICROWAVE APPLICATION, AND METHOD OF PRODUCING THE DIELECTRIC RESONATOR OR FILTER

[75] Inventors: Masahiro Abe; Tatsumi Sugiura; Tsutomu Nanataki; Shinsuke Yano, all of Nagoya, Japan

[73] Assignee: NGK Insulators, Ltd., Japan

[21] Appl. No.: 145,082

[22] Filed: Nov. 3, 1993

Related U.S. Application Data

[62] Division of Ser. No. 971,179, Nov. 3, 1992, Pat. No. 5,290,740.

[30] Foreign Application Priority Data

| Nov. 6, 1991 | [JP] | Japan | 3-319786 |
| Mar. 18, 1992 | [JP] | Japan | 4-92184 |
| Mar. 23, 1992 | [JP] | Japan | 4-97184 |
| Oct. 27, 1992 | [JP] | Japan | 4-312970 |

[51] Int. Cl.$^5$ .............................................. H01P 7/08
[52] U.S. Cl. .................................. 333/219; 333/222; 29/592.1
[58] Field of Search .......... 501/137, 138, 139; 333/203, 204, 205, 219, 222, 238, 246; 29/592.1

[56] References Cited

U.S. PATENT DOCUMENTS

| 3,938,064 | 2/1976 | O'Bryan, Jr. et al. | 501/137 |
| 4,222,783 | 9/1980 | Atsumi et al. | 501/139 |
| 4,335,216 | 6/1982 | Hodgkins et al. | 501/138 |
| 4,603,311 | 7/1986 | Mage | 333/203 |
| 4,609,892 | 9/1986 | Higgins, Jr. | 333/222 |
| 4,610,968 | 9/1986 | Wada et al. | 501/137 |
| 4,610,971 | 9/1986 | Wada et al. | 501/137 |
| 4,692,725 | 9/1987 | Fukasawa et al. | 333/203 |
| 4,816,788 | 3/1989 | Ishikawa et al. | 333/203 |
| 4,999,737 | 3/1991 | Kishi et al. | 501/137 |
| 5,097,237 | 3/1992 | Komazaki et al. | 333/204 |

FOREIGN PATENT DOCUMENTS

| 0385339 | 2/1990 | European Pat. Off. . |
| 0412440 | 2/1991 | European Pat. Off. . |
| 1474421 | 10/1969 | Fed. Rep. of Germany . |
| 978110 | 4/1951 | France . |
| 2601357 | 7/1987 | France . |
| 55-22012 | 6/1980 | Japan . |
| 57-69607 | 4/1982 | Japan . |
| 58-20905 | 4/1983 | Japan . |
| 58-73908 | 5/1983 | Japan . |
| 60-257008 | 12/1985 | Japan . |
| 1242953 | 10/1986 | Japan . |

*Primary Examiner*—Mark L. Bell
*Assistant Examiner*—Deborah Jones

[57] ABSTRACT

A dielectric ceramic composition is disclosed which includes: a main ceramic composition of barium oxide and titanium oxide, or barium oxide, titanium oxide and at least one of strontium oxide, calcium oxide, zirconia and zinc oxide, which composition is represented by $(1-a-b)BaO \cdot aSrO \cdot bCaO \cdot x[(1-c)TiO_2 \cdot cZrO_2] \cdot yZnO$, where $3.1 \leq x \leq 5.4$, $0 \leq y \leq 2.9$, $0 \leq a+b \leq 0.4$, $0 \leq c \leq 0.2$; and a secondary component at least a part of which consists of a $B_2O_3$ material or a glass material containing $B_2O_3$ as one of glass components, the secondary component being added to the main ceramic composition, in an amount of 0.1–7.5 parts by weight of $B_2O_3$ per 100 parts by weight of the main ceramic composition. Also disclosed are a method of preparing such a dielectric ceramic composition, a dielectric resonator for microwave application which uses the dielectric ceramic composition, or a dielectric filter having a plurality of such dielectric resonators, and a method of producing the dielectric resonator or dielectric filter.

2 Claims, 1 Drawing Sheet

DIELECTRIC RESONATOR OR FILTER FOR MICROWAVE APPLICATION, AND METHOD OF PRODUCING THE DIELECTRIC RESONATOR OR FILTER

This is a division of application Ser. No. 07/971,179, filed Nov. 3, 1992, now U.S. Pat. No. 5,290,740.

BACKGROUND OF THE INVENTION

1. Field of the Invention

The present invention relates in general to a dielectric ceramic composition used for producing a dielectric resonator or filter for microwave application, and a method of preparing such a dielectric ceramic composition. In particular, the invention is concerned with a dielectric ceramic composition which can be fired at a relatively low temperature, and which is suitably used for dielectric resonators having internal conductive strips, of a stripline type filter, for example, and with a method of preparing such a dielectric ceramic composition. The present invention is also concerned with a dielectric resonator for microwave application, which is obtained by using the above dielectric ceramic composition, or a dielectric filter having a plurality of such dielectric resonators, and with a method of producing the dielectric resonator or dielectric filter.

2. Discussion of the Prior Art

In a modern microwave telecommunication system such as a portable or automobile telephone system, there is widely used a coaxial type dielectric filter using a ceramic composition having a high dielectric constant. The coaxial type dielectric filter has a plurality of coaxial type resonators connected to each other. Each resonator is a cylindrical dielectric block which has inside and outside conductors formed on inner and outer circumferential surfaces of the block, respectively. This type of dielectric filter has a limitation in reducing the size and thickness thereof due to its construction. In view of this, there is proposed a stripline type filter of a tri-plate structure, which incorporates internal conductive strips or layers within a dielectric substrate. In this stripline type filter, a patterned array of conductors in the form of strips are integrally embedded in the dielectric substrate so as to provide a plurality of resonators. The thus constructed stripline type filter is comparatively compact and thin.

In fabricating such a stripline type dielectric filter having the internal conductive strips as described above, a dielectric ceramic composition must be co-fired with the internal conductive strips. Since known dielectric ceramic compositions have a considerably high firing temperature of 1300°–1500° C., there is a limit to conductive materials which can be used for the internal conductive strips, thus making it difficult to employ a Cu-contained or Ag-contained material having a relatively low conductivity resistance. For instance, the firing temperature of the dielectric ceramic composition must not exceed 1100° C. when alloys containing Cu or Ag are used for the internal conductive strips, and must not exceed 1000° C. when Ag-Pd or Ag-Pt alloys are used for the conductive strips. When the conductive layers are formed solely of Ag having a low conductivity resistance, in particular, the firing temperature of the dielectric ceramic composition must be controlled to be around 900° C. which is lower than the melting point of Ag, that is, 962° C. To meet the needs, a dielectric ceramic composition is needed which can be fired at a sufficiently low temperature while assuring excellent microwave characteristics.

Among various dielectric ceramic compositions for microwave application which have been proposed, a dielectric ceramic composition which contains BaO and $TiO_2$ as major components is known as having a high specific dielectric constant of about 30–40, a large unloaded Q, and a small temperature coefficient of the resonance frequency. In JP-B2-58-20905, for example, there is provided a detailed description of a method of producing a dielectric ceramic of $BaO-TiO_2$ system, which is composed of $Ba_2Ti_9O_{20}$ and fired at a temperature as high as 1300°–1400° C. Thus, the known method does not meet the above requirement for a lower firing temperature.

It has been proposed in JP-A-57-69607, JP-A-58-73908 and JP-A-60-257008 that ZnO or $SnO_2$, or ZnO and $ZrO_2$ is/are added to the dielectric ceramic composition of the $BaO-TiO_2$ system, so as to improve the dielectric properties of resulting dielectric ceramics. However, this dielectric ceramic composition still requires an undesirably high firing temperature of 1200°–1400° C.

In one method of producing a temperature-compensating thick-film condenser as disclosed in JP-B2-55-22012, a dielectric ceramic powder of $TiO_2-SnO_2-BaO$ system is mixed with a glass frit such as a barium lead borosilicate glass and a lead borosilicate glass, and the mixture obtained is fired at 950° C. to provide a dielectric ceramic. While the thus obtained dielectric ceramic may be suitably used for thick-film condensers, a dielectric resonator or filter for microwave application, which is produced by using the dielectric ceramic, exhibits a deteriorated unloaded Q and an increased temperature coefficient of the resonance frequency, which adversely affect the function of the resonator or filter.

SUMMARY OF THE INVENTION

It is therefore a first object of the present invention to provide a dielectric ceramic composition used for producing a dielectric resonator or filter for microwave application, which gives a dielectric ceramic that exhibits excellent properties in terms of the specific dielectric constant, unloaded Q, and temperature coefficient of the resonance frequency, for example, and which can be fired at a temperature of 1100° C. or lower, preferably 1000° C. or lower and more preferably around 900° C. It is a second object of the invention to provide a method of preparing such a dielectric ceramic composition as described above. It is a third object of the invention to provide a dielectric resonator for microwave application, which is obtained by using such a dielectric ceramic composition as described above, or a dielectric filter which is constituted by a plurality of the resonators. Further, it is a fourth object to provide a method of producing the above-described dielectric resonator or dielectric filter.

Having made various attempts and analyses to accomplish the above objects, the inventors found that a $B_2O_3$ material or a glass material containing $B_2O_3$ as a glass component may be added in a suitable amount to a dielectric ceramic composition of $BaO-TiO_2$ system, $BaO-TiO_2-ZnO$ system, $BaO-TiO_2-ZrO_2$ system, $BaO-TiO_2-ZrO_2-ZnO$ system, $BaO-SrO/CaO-TiO_2$ system, $BaO-SrO/CaO-TiO_2-ZnO$ system, $BaO-SrO/CaO-TiO_2-ZrO_2$ system, $BaO-SrO/CaO-TiO_2-ZrO_2-ZnO$ system, or the like, so that the obtained ceramic composition can be fired at a significantly lowered temperature while assuring excellent dielectric properties.

The present invention was completed based on the inventors' finding as described above. The first object may be therefore accomplished according to a first aspect of the present invention, which provides a dielectric ceramic composition used or producing a dielectric resonator or filter for microwave application, which consists essentially of: a main ceramic composition comprising as major components barium oxide and titanium oxide, or barium oxide, titanium oxide and at least one of strontium oxide, calcium represented by $(1-a-b)BaO.aSrO.bCaO.x[(1-c)TiO_2.cZrO_2].yZnO$, where $3.1 \leq x \leq 5.4$, $0 \leq y \leq 2.9$, $0 \leq a+b \leq 0.4$, $0 \leq c \leq 0.2$; and a secondary component at least part of which consists of a $B_2O_3$ material or a glass material containing $B_2O_3$ as one of glass components, the secondary component being added to the main ceramic composition, in an amount of 0.1–7.5 parts by weight of $B_2O_3$ per 100 parts by weight of the main ceramic composition.

The second object of the invention may be attained according to a second aspect of the present invention, which provides a method of preparing the dielectric ceramic composition according to the first aspect of the present invention, comprising the steps of: calcining a mixture of starting materials which give the main ceramic composition, to provide a calcined mixture; finely pulverizing the calcined mixture to provide a calcined ceramic powder; and adding the secondary component to the calcined ceramic powder.

The third object of the invention may be attained according to a third aspect of the present invention, which provides a dielectric resonator for microwave application or a dielectric filter comprising a plurality of dielectric resonators, comprising: a dielectric ceramic obtained by firing the dielectric ceramic composition according to the first aspect of the invention; and a conductor pattern which is formed by co-firing with the dielectric ceramic so that the conductor pattern is incorporated in the dielectric ceramic. The conductor pattern is formed of a material selected from the group consisting of Ag, Cu, an alloy containing Ag as a major component, and an alloy containing Cu as a major component.

The fourth object of the invention may be attained according to a fourth aspect of the invention, which provides a method of producing a dielectric resonator for microwave application or a dielectric filter comprising a plurality of the dielectric resonators, the dielectric resonator comprising a dielectric ceramic, and a conductor pattern incorporated in the dielectric ceramic, comprising the steps of: preparing a green sheet or calcined body made of the dielectric ceramic composition according to the first aspect of the invention, which gives the dielectric ceramic; forming at least one conductive layer which gives the conductor pattern, on the green sheet or calcined body, the above-indicated at least one conductive layer being formed of a material selected from the group consisting of Ag, Cu, an alloy containing Ag as a major component, and an alloy containing Cu as a major component; and co-firing the green sheet or calcined body of the dielectric ceramic composition with the above-indicated at least one conductive layer.

DETAILED DESCRIPTION OF THE PRESENT INVENTION

Figure 1:
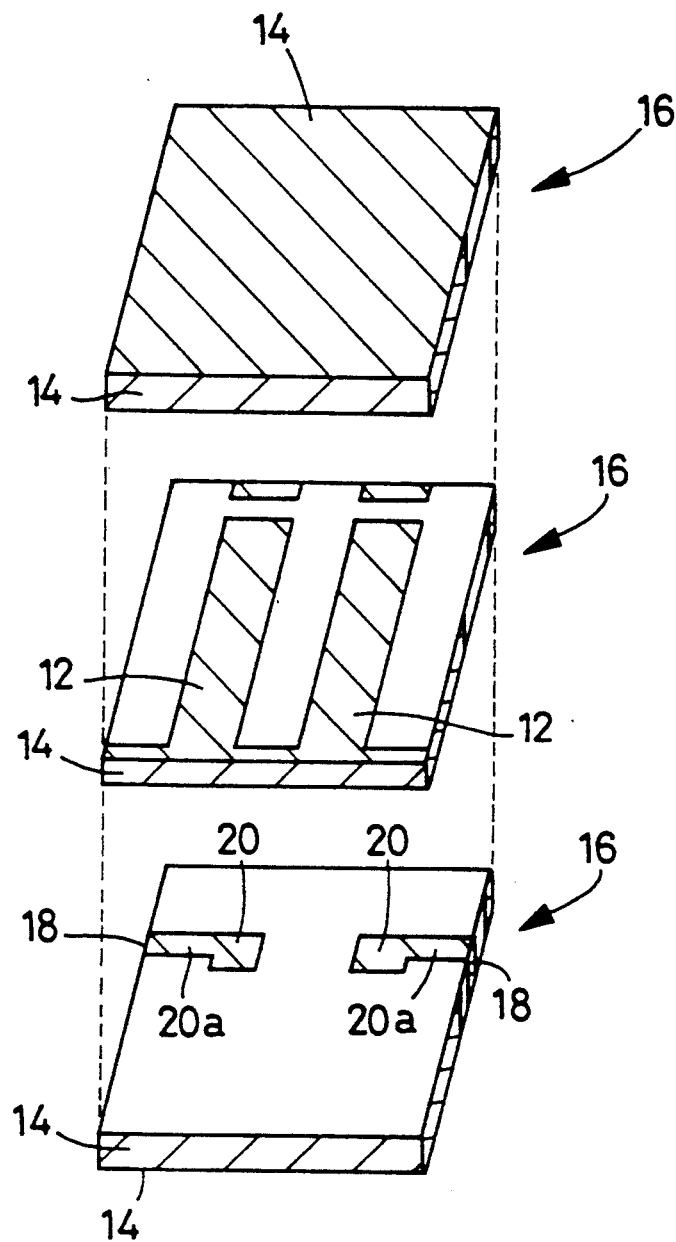
FIG. 1 is an exploded perspective view showing a laminar structure of a bandpass filter produced in EXAMPLE 3.

In the dielectric ceramic composition as described above, the main ceramic composition consists principally of BaO (barium oxide) and $TiO_2$ (titanium oxide), or of BaO, $TiO_2$, and at least one of SrO (strontium oxide), CaO (calcium oxide), $ZrO_2$ (zirconia) and ZnO (zinc oxide). The above-indicated term $(1-a-b)BaO.aSrO.bCaO$ indicates that a portion of BaO may be substituted by at least one of SrO and CaO. With a portion of BaO substituted by SrO and/or CaO, the specific dielectric constant can be increased, and the temperature coefficient ($\tau f$) of the resonance frequency can be varied in the positive direction. Therefore, the substitution is effective to compensate for the temperature coefficient ($\tau f$), when the composition contains ZnO or $ZrO_2$. The above substitution is also effective to improve the sinterability of the ceramic composition. If the substituting proportion (a+b) exceeds 0.4, however, the temperature coefficient of the resonance frequency goes highly positive, and the unloaded Q is reduced, whereby the dielectric ceramics obtained are not suitable for practical use. To assure a sufficiently large unloaded Q and an improved specific dielectric constant, the substituting proportion (a+b) is preferably held in a range of $0.05 \leq a+b \leq 0.2$.

In the present dielectric ceramic composition, the molar ratio of $TiO_2$ or $[(1-c)TiO_2.cZrO_2]$ to the total amount (1 mol) of $(1-a-b)BaO.aSrO.bCaO$ must be held in a range of 3.1~5.4 mol ($3.1 \leq x \leq 5.4$), preferably, in a range of 3.5~5.0 mol. If the molar ratio of $TiO_2$ or $[(1-c)TiO_2.cZrO_2]$ exceeds 5.4 mol ($5.4 \leq x$), the temperature coefficient ($\tau f$) of the resonance frequency is undesirably increased, thereby making the dielectric ceramics unsuitable for practical use. If the molar ratio is smaller than 3.1 mol ($x \leq 3.1$), the unloaded Q is considerably reduced. To assure a sufficiently large unloaded Q, the above molar ratio is particularly desirably held in a range of 3.8~4.2 mol ($3.8 \leq x \leq 4.2$). While the temperature coefficient of the resonance frequency can be varied in the negative direction by substituting a portion of $TiO_2$ by $ZrO_2$, the unloaded Q or the specific dielectric constant may deteriorate if the substituting proportion (c) exceeds 0.2. The substitution of $TiO_2$ by $ZrO_2$ is effective to improve the sinterability of the ceramic composition, and also improve the specific dielectric constant when the substituting proportion is comparatively small ($C \leq 0.10$).

When the main ceramic composition includes ZnO, in addition to the above-described BaO and $TiO_2$, or BaO, $TiO_2$ and at least one of SrO, CaO and $ZrO_2$, the molar ratio (y) of ZnO should not be higher than 2.9 mol ($y \leq 2.9$). If ZnO exceeds 2.9 mol ($2.9 < y$), the temperature coefficient of the resonance frequency goes excessively negative. In preparing the present dielectric ceramic composition, the temperature coefficient of the resonance frequency can be effectively controlled to a desired value, by appropriately varying the proportion of $TiO_2$ (x) to ZnO (y). Particularly, the temperature coefficient can be varied in the negative direction by increasing the molar ratio of ZnO (y).

The dielectric ceramic composition according to the first aspect of the invention includes a main ceramic composition, which contains as major components barium oxide and titanium oxide, or barium oxide, titanium oxide, and at least one of strontium oxide, calcium oxide, zirconia and zinc oxide, in the above-described proportion. To the main ceramic composition, there may be added suitable metal oxide, such as alumina, tungsten oxide, nickel oxide, iron oxide, manganese oxide, or chromium oxide, in an attempt to improve the unloaded Q and suitably adjust or control the temperature coefficient of the resonance frequency.

$B_2O_3$, which is added as an essential constituent of the secondary component to the main ceramic composition according to the invention, is effective to enable the dielectric ceramic composition to be fired at a relatively low temperature, that is, at 1100° C. or lower, preferably at 1000° C. or lower, more preferably at a temperature of not higher than 962° C. which is the melting point of Ag, most preferably at 950° C. or lower. The $B_2O_3$ may be added as a sole constituent element, in other words, a $B_2O_3$ powder may be added to the main ceramic composition. Alternatively, the $B_2O_3$ may be added at a time together with other constituents, such as ZnO, $SiO_2$ and $Bi_2O_3$. In particular, the addition of ZnO is effective to improve the specific dielectric constant while maintaining a sufficiently large unloaded Q, and the addition of $SiO_2$ or $Bi_2O_3$ is effective to improve the sinterability of the dielectric ceramic composition. Upon addition of these constituents, respective powders of ZnO, $SiO_2$ and $Bi_2O_3$ may be added at a time with a $B_2O_3$ powder, or these constituents and $B_2O_3$ may be vitrified and then added to the main ceramic composition.

Since $B_2O_3$ present as a sole constituent element is likely to absorb water and may affect the state of preservation of the ceramic material after the addition thereof, the $B_2O_3$ is desirably incorporated into a glass, which is then added to the main ceramic composition, so as to solve the above problem. The water absorption of $B_2O_3$ also results in a poor state of a slurry upon forming a green sheet from the ceramic material, making it difficult to obtain a good tape. This problem is also solved by the vitrification of $B_2O_3$. There are known a lot of glass formulations containing $B_2O_3$, such as a ZnO-$SiO_2$-$B_2O_3$ glass, $SiO_2$-$B_2O_3$ glass, and $Bi_2O_3$-ZnO-$B_2O_3$ glass, any of which can be advantageously employed in practicing the present invention.

The secondary component containing $B_2O_3$ as an essential constituent may be added to the calcined powder of the main ceramic composition, or may be added to a mixture of starting materials which give the main ceramic composition, prior to calcining of the starting materials. In this regard, the former method, namely, adding the secondary component to the calcined ceramic powder is preferred in view of the dielectric properties of the dielectric ceramics obtained.

The amount of addition of the secondary component in either of the above two methods is determined such that $B_2O_3$ is contained in the dielectric ceramic composition, in an amount of 0.1–7.5 parts by weight per 100 parts by weight of the main ceramic composition. If the amount of addition of the secondary component is so small that the $B_2O_3$ content is smaller than 0.1 part by weight, the $B_2O_3$ added may not yield a satisfactory effect, and the sinterability of the ceramic material obtained may deteriorate. If the $B_2O_3$ content exceeds 7.5 parts by weight, on the other hand, the unloaded Q may deteriorate in the microwave region. Preferably, $B_2O_3$ of the secondary component is contained in an amount of 0.1–6.0 parts by weight per 100 parts by weight of the main ceramic composition.

As described above, the principle of the present invention resides in that $B_2O_3$ is added as at least a part of the secondary component to the main ceramic composition. However, it is also desirable that the mixture of materials which give the main ceramic composition be calcined at a relatively high temperature, e.g., at 900° C. or higher, and that the calcined mixture be finely pulverized to achieve the average grain size of not larger than 0.8 μm, preferably not larger than 0.7 μm.

More specifically, when the calcining temperature for the materials giving the main ceramic composition is 900° C. or higher, preferably 1000° C. or higher, the obtained calcined mass (main ceramic composition) can be sufficiently crystallized, thereby making the resultant dielectric ceramics satisfactory in its dielectric properties such as the specific dielectric constant and unloaded Q, even if the firing temperature thereof is relatively low. If the calcining temperature exceeds 1350° C., however, the calcined mass is likely to excessively harden after the calcining process, causing some problem in handling thereof. In view of this, the calcining temperature is preferably held between 1000° C. and 1300° C.

In pulverizing the thus calcined product, the smaller the average grain size of a ceramic powder obtained by the pulverization, the lower the firing temperature of the dielectric ceramic composition obtained, assuring improvements in the specific dielectric constant and unloaded Q of the resultant dielectric ceramics. In a preferred form of the present invention, therefore, the calcined product is pulverized to achieve the average grain size of not larger than 0.8 μm, preferably not larger than 0.7 μm, making it possible to fire the obtained dielectric ceramic composition at a relatively low temperature, e.g., 962° C. (the melting point of Ag) or lower. As the grain size of the calcined ceramic powder is smaller, the sinterability is improved with a result of reduction in the amount of addition of the secondary component ($B_2O_3$), leading to improvements in the microwave characteristics of the fired dielectric ceramics. If the average grain size of the ceramic powder is smaller than 0.1 μm, however, the formability of the dielectric ceramic composition obtained may deteriorate, making it difficult to form a tape by an ordinary doctor blade technique, for example. Therefore, the average grain size of the ceramic powder is desirably controlled to within a range of 0.1–0.8 μm. Generally, such a small grain size of the ceramic powder is measured by a laser diffraction and scattering method.

It is not necessary to effect fine pulverization to provide the $B_2O_3$ powder, or the glass powder containing $B_2O_3$, which is added as a secondary component to the calcined ceramic powder which is finely pulverized as described above. For instance, a $B_2O_3$ powder or glass powder having the average grain size of about 2 μm to 4 μm can be used without causing any problem.

When the secondary component is added to the materials giving the main ceramic composition prior to the calcining step, the calcined mass including the secondary component is finely pulverized to provide a powder having the average grain size of not larger than 0.8 μm, which powder constitutes the dielectric ceramic composition used for producing the dielectric resonator or filter for microwave application.

EXAMPLES

To further clarify the concept of the present invention, some examples of the invention will be described. It is to be understood that the invention is not limited to the details of the illustrated examples, but may be embodied with various alterations, modifications and improvements, which may occur to those skilled in the art.

EXAMPLE 1

Initially, highly pure barium oxide, strontium oxide, calcium oxide, titanium oxide, zinc oxide and zirconia were weighed to give main ceramic compositions of specimens No. 1 through No. 11, which are represented by $(1-a-b)BaO.aSrO.bCaO.x[(1-c)TiO_2.cZrO_2].yZnO$ where x, y, a, b and c of each specimen are such as indicated in TABLE 1. The thus weighed materials were wet-blended with ion-exchange water in a polyethylene pot mill using zirconia balls having a diameter of 10 mm. The thus obtained mixture (slurry) was taken out of the pot mill, dried, put into an alumina crucible, and calcined in air for four hours at 1150° C.

Then, the calcined mixture was roughly crushed by a roll crusher, and passed through a 24-mesh sieve. The obtained powder was thrown back into the polyethylene pot mill with zirconia balls having a diameter of 5 mm, and wet-pulverized with ion-exchange water, to achieve the average grain size of 0.4–0.5 μm as measured by a laser diffraction and scattering method. In this manner, calcined ceramic powders of specimens Nos. 1–11 were obtained.

Subsequently, the calcined ceramic powder of each specimen was wet-blended with a $B_2O_3$ (boric oxide) powder as the secondary component, in an amount (parts by weight) as specified in TABLE 1 per 100 parts by weight of the ceramic powder, in a polyethylene pot mill with ion-exchange water, using alumina balls. At this point, 1% by weight of polyvinyl alcohol (PVA) was added as a binder for achieving the following press-forming. The thus obtained slurry was then dried, passed through a sieve having openings of 355 μm, and thus granulated. In specimens No. 4 and No. 5, a ZnO (zinc oxide) powder as well as the $B_2O_3$ powder was added in an amount as indicated in TABLE 1. In specimen No. 6, the $B_2O_3$ powder was added to the main ceramic composition prior to calcining, and then calcined at 1100° C., finely pulverized and granulated as described above.

The thus prepared granules of each specimen were formed with a press at a surface pressure of 1 ton/cm², into a circular disc having a diameter of 20 mm and a thickness of 15 mm. The circular discs corresponding to specimens Nos. 1–11 were fired in air for two hours at 900° C., to thereby provide respective samples of dielectric ceramics. These samples were ground into circular discs each having a diameter of 16 mm and a thickness of 8 mm, and the dielectric properties of each sample were measured. More specifically, the specific dielectric constant (∈r) and unloaded Q were measured according to Hakki & Coleman method, while the temperature coefficient (f) of the resonance frequency was measured over a range from −25° C. to +75° C. The measurement was effected at a frequency of 3–5 GHz. The results of the measurement are also indicated in TABLE 1.

It will be understood from the results of the above measurements on specimens Nos. 1–3 and 7–11 that the addition of the boric oxide as the secondary component permits the obtained dielectric ceramic composition to be sintered at 900° C. However, excessive addition of the boric oxide results in an increased temperature coefficient of the resonance frequency and a reduced unloaded Q, as in specimen No. 11 ( comparative example ). Referring to specimens Nos. 4 and 5, the concurrent addition of zinc oxide and boric oxide results in an improved unloaded Q. Further, it is apparent from the result of the measurements on specimen No. 6 that when the boric oxide is first added to the mixture of materials giving the main ceramic composition, and then calcined, the obtained dielectric ceramics is satisfactory in its properties for practical use, though the unloaded Q is reduced as compared with when the boric oxide is added to the calcined ceramic powder.

TABLE 1

| No. | Main ceramic composition | | | | | Secondary component | | Dielectric properties | | |
|---|---|---|---|---|---|---|---|---|---|---|
| | x | y | a | b | c | $B_2O_3$ (parts by weight) | Other constituents (parts by weight) | ∈ r | Q (3 GHz) | τ f (ppm/°C.) |
| * 1 | 4.0 | 0 | 0 | 0 | 0 | 0.0 | ZnO 1.0 | unsintered | — | — |
| 2 | 4.0 | 0 | 0 | 0 | 0 | 0.1 | ZnO 2.0 | 26 | 4200 | 24 |
| 3 | 4.0 | 0.75 | 0 | 0 | 0 | 1.0 | | 33 | 6500 | −1 |
| 4 | 4.0 | 0.75 | 0 | 0 | 0 | 1.0 | | 33 | 6700 | −3 |
| 5 | 4.0 | 0.75 | 0 | 0 | 0 | 1.0 | | 33 | 6700 | −2 |
| 6 | 4.5 | 1.0 | 0 | 0 | 0 | 1.0 | | 33 | 3100 | 21 |
| * 7 | 4.5 | 1.5 | 0 | 0 | 0 | 0.0 | | unsintered | — | — |
| 8 | 4.5 | 1.5 | 0 | 0 | 0 | 1.0 | | 34 | 7800 | 28 |
| 9 | 4.5 | 1.5 | 0 | 0 | 0 | 2.0 | | 35 | 8200 | 39 |
| 10 | 4.5 | 1.5 | 0 | 0 | 0 | 4.0 | | 35 | 6100 | 52 |
| * 11 | 4.5 | 1.5 | 0 | 0 | 0 | 8.0 | | 30 | 2600 | 103 |

* : comparative example
Main ceramic composition: $(1-a-b) BaO.aSrO.bCaO.x[(1-c) TiO_2.cZrO_2].yZnO$

EXAMPLE 2

Initially, highly pure barium oxide or barium carbonate, strontium oxide, calcium oxide, titanium oxide, zinc oxide and zirconia were weighed to give main ceramic compositions of specimens No. 12 through No. 59, which are represented by $(1-a-b)BaO.aSrO.bCaO.x[(1-c)TiO_2.cZrO_2].yZnO$ where x, y, a, b and c of each specimen are such as indicated in TABLE 4, 5 and 6. The thus weighed materials were wet-blended with ion-exchange water in a polyethylene pot mill using zirconia balls having a diameter of 10 mm. The thus obtained mixture (slurry) was taken out of the pot mill, dried, put into an alumina crucible, and calcined in air for four hours at respective temperatures between 1150° C. and 1250° C.

Then, the calcined mixture was roughly crushed by a roll crusher, and passed through a 24-mesh sieve. The thus obtained powder was thrown back into the polyethylene pot mill with zirconia balls having a diameter of 5 mm, and pulverized with ion-exchange water, to achieve the average grain size of 0.4–1.0 μm as measured by a laser diffraction and scattering method. In this manner, calcined ceramic powders of specimens Nos. 12–59 were obtained.

On the other hand, highly pure zinc oxide, boric oxide, silicon oxide and bismuth oxide were weighed in the respective proportions as indicated in TABLE 2, and thrown into a polyethylene pot mill with 10 mm-diameter alumina balls, and dry-blended. The thus obtained mixture was heated and fused at a temperature of 1100° C.–1250° C. for 20 min. in a chamotte crucible, and then rapidly cooled off in water and thus vitrified. The glass obtained was thrown with alumina balls into an alumina pot mill, and pulverized in ethanol to achieve the average grain size of 2–6 μm as measured by a laser diffraction and scattering method. In this manner, various glass formulations (A through I) having respective glass compositions as indicated in TABLE 2 were obtained as the secondary component.

TABLE 2

| Glass No. | $B_2O_3$ (wt. %) | ZnO (wt. %) | $SiO_2$ (wt. %) | $Bi_2O_3$ (wt. %) |
| --- | --- | --- | --- | --- |
| A | 11 | 64 | 25 | — |
| B | 20 | 65 | 15 | — |
| C | 25 | 71 | 4 | — |
| D | 25 | 65 | 10 | — |
| E | 29 | 63 | 8 | — |
| F | 40 | 45 | 15 | — |
| G | 33 | 38 | — | 29 |

TABLE 2-continued

| Glass No. | $B_2O_3$ (wt. %) | ZnO (wt. %) | $SiO_2$ (wt. %) | $Bi_2O_3$ (wt. %) |
| --- | --- | --- | --- | --- |
| H | 38 | 42 | — | 20 |
| I | 19 | — | 81 | — |

Subsequently, 100 parts by weight of the above-described calcined ceramic powder of each specimen and 0–10 parts by weight of a selected one of the glass formulations (A-I) as the secondary component were used to produce a corresponding circular disc in the same manner as EXAMPLE 1, which will be used for measurement of its properties. In specimen No. 52 in TABLE 6, a $ZnO$-$B_2O_3$-$SiO_2$ glass is added to the main ceramic composition prior to calcining, and then calcined at 1100° C., and the calcined mass was finely pulverized and granulated as in the other specimens.

There were also prepared glass formulations (J, K, L) having respective compositions as indicated in TABLE 3. Each glass prepared was added in an amount of 2 parts by weight per 100 parts by weight of the above-indicated calcined ceramic powder, to produce a corresponding circular disc to be used for measurement of its properties, in the same manner as EXAMPLE 1.

TABLE 3

| Glass No. | $B_2O_3$ (wt. %) | Glass composition (wt. %) | | | | | | | |
| --- | --- | --- | --- | --- | --- | --- | --- | --- | --- |
| J | 0 | $SiO_2$ | 42 | BaO | 25 | PbO | 22 | $Al_2O_3$ | 6 CaO 5 |
| K | 9 | PbO | 59 | $SiO_2$ | 29 | $Al_2O_3$ | 3 | $B_2O_3$ | 9 |
| L | 16 | PbO | 71 | $SiO_2$ | 10 | $Al_2O_3$ | 3 | $B_2O_3$ | 16 |

The circular discs thus obtained were fired in air for two hours at a temperature between 870° C. and 900° C., to provide respective samples Nos. 12–59 of dielectric ceramics. The dielectric properties of each fired sample were measured in the same manner as EXAMPLE 1, and the results of the measurement are indicated in TABLE 4, TABLE 5 and TABLE 6.

TABLE 4

| | Main ceramic composition | | | | | Glass | | $B_2O_3$ | | Dielectric properties | | |
| --- | --- | --- | --- | --- | --- | --- | --- | --- | --- | --- | --- | --- |
| No. | x | y | a | b | c | Comp. | Parts by weight | (parts by weight) | Firing temp. (°C.) | ε r | Q (3 GHz) | τ f (ppm/°C.) |
| *12 | 3.0 | 0 | 0 | 0 | 0 | D | 2.0 | 0.50 | 900 | 35 | 2500 | 60 |
| 13 | 3.5 | 0 | 0 | 0 | 0 | D | 2.0 | 0.50 | 900 | 34 | 6300 | 42 |
| 14 | 4.0 | 0 | 0 | 0 | 0 | D | 2.0 | 0.50 | 900 | 35 | 8200 | 25 |
| 15 | 4.5 | 0 | 0 | 0 | 0 | D | 2.0 | 0.50 | 900 | 32 | 4000 | 15 |
| 16 | 5.0 | 0 | 0 | 0 | 0 | D | 2.0 | 0.50 | 900 | 37 | 3400 | 45 |
| *17 | 5.5 | 0 | 0 | 0 | 0 | D | 2.0 | 0.50 | 900 | 37 | 3000 | 82 |
| 18 | 4.0 | 0.2 | 0 | 0 | 0 | D | 2.0 | 0.50 | 900 | 33 | 8400 | 20 |
| 19 | 4.0 | 0.5 | 0 | 0 | 0 | D | 2.0 | 0.50 | 900 | 33 | 8100 | 8 |
| 20 | 4.0 | 1.0 | 0 | 0 | 0 | D | 2.0 | 0.50 | 900 | 30 | 7500 | −10 |
| 21 | 4.0 | 2.0 | 0 | 0 | 0 | D | 2.0 | 0.50 | 900 | 28 | 6500 | −40 |
| *22 | 4.0 | 3.0 | 0 | 0 | 0 | D | 2.0 | 0.50 | 900 | 26 | 5700 | −67 |
| 23 | 4.0 | 0.75 | 0 | 0 | 0 | D | 0 | 0 | 900 | 12 | 900 | — |
| 24 | 4.0 | 0.75 | 0 | 0 | 0 | D | 2.0 | 0.50 | 900 | 32 | 7900 | −1 |
| 25 | 4.0 | 0.75 | 0 | 0 | 0 | D | 3.0 | 0.75 | 900 | 33 | 7000 | −1 |
| 26 | 4.0 | 0.75 | 0 | 0 | 0 | D | 5.0 | 1.25 | 900 | 33 | 6200 | −1 |
| 27 | 4.0 | 0.75 | 0 | 0 | 0 | D | 10.0 | 2.50 | 900 | 31 | 3900 | −2 |
| 28 | 4.0 | 0.75 | 0 | 0 | 0 | B | 2.0 | 0.40 | 900 | 25 | 6800 | −1 |
| 29 | 4.0 | 0.75 | 0 | 0 | 0 | E | 2.0 | 0.58 | 900 | 33 | 7800 | −2 |

* : comparative example
— : unmeasurable
Main ceramic composition: (1-a-b) BaO.aSrO.bCaO.x[(1-c) $TiO_2$.c$ZrO_2$].yZnO

TABLE 5

| No. | Main ceramic composition | | | | | Glass | | B$_2$O$_3$ (parts by weight) | Firing temp. (°C.) | Dielectric properties | | |
|---|---|---|---|---|---|---|---|---|---|---|---|---|
| | x | y | a | b | c | Comp. | Parts by weight | | | ε r | Q (3 GHz) | τ f (ppm/°C.) |
| 30 | 4.0 | 0 | 0 | 0.05 | 0 | D | 2.0 | 0.50 | 900 | 35 | 8200 | 26 |
| 31 | 4.0 | 0 | 0.1 | 0 | 0 | D | 2.0 | 0.50 | 890 | 37 | 7900 | 28 |
| 32 | 4.0 | 0 | 0.2 | 0 | 0 | D | 2.0 | 0.50 | 880 | 40 | 7400 | 29 |
| 33 | 4.0 | 0 | 0 | 0.02 | 0 | D | 2.0 | 0.50 | 900 | 36 | 7800 | 24 |
| *34 | 4.0 | 0 | 0 | 0.5 | 0 | D | 2.0 | 0.50 | 890 | 38 | 1200 | 52 |
| 35 | 4.2 | 0 | 0.1 | 0.05 | 0 | D | 2.0 | 0.50 | 890 | 39 | 7100 | 31 |
| 36 | 4.05 | 0 | 0 | 0 | 0.05 | D | 3.0 | 0.75 | 900 | 34 | 4800 | 15 |
| 37 | 4.1 | 0 | 0 | 0 | 0.1 | D | 3.0 | 0.75 | 900 | 33 | 4500 | 14 |
| 38 | 4.0 | 0 | 0.2 | 0 | 0.1 | D | 2.0 | 0.50 | 880 | 41 | 4900 | 10 |
| 39 | 4.0 | 0.75 | 0.2 | 0 | 0.1 | D | 2.0 | 0.50 | 870 | 38 | 5000 | 1 |
| *40 | 4.0 | 0.75 | 0.1 | 0.1 | 0.4 | D | 2.0 | 0.50 | 900 | 22 | 1000 | −10 |
| 41 | 4.0 | 0 | 0 | 0 | 0 | A | 2.0 | 0.22 | 900 | 33 | 8400 | 25 |
| 42 | 4.0 | 0 | 0 | 0 | 0 | C | 2.0 | 0.50 | 900 | 35 | 8100 | 25 |
| 43 | 4.0 | 0 | 0 | 0 | 0 | I | 2.0 | 0.38 | 900 | 26 | 2500 | 47 |
| 44 | 4.0 | 0 | 0 | 0 | 0 | G | 2.0 | 0.66 | 900 | 36 | 3500 | 20 |
| 45 | 4.0 | 0.75 | 0 | 0 | 0 | G | 2.0 | 0.66 | 900 | 33 | 4300 | −4 |
| 46 | 4.0 | 0.75 | 0 | 0 | 0 | G | 3.0 | 0.99 | 900 | 33 | 3900 | 2 |
| 47 | 4.0 | 0.75 | 0 | 0 | 0 | G | 5.0 | 1.65 | 900 | 32 | 3400 | −4 |
| 48 | 4.0 | 0.75 | 0 | 0 | 0 | G | 10.0 | 3.30 | 900 | 31 | 2500 | 17 |

* : comparative example
Main ceramic composition: (1-a-b) BaO.aSrO.bCaO.x[(1-c) TiO$_2$.cZrO$_2$].yZnO

TABLE 6

| No. | Main ceramic composition | | | | | Glass | | B$_2$O$_3$ (parts by weight) | Firing temp. (°C.) | Dielectric properties | | |
|---|---|---|---|---|---|---|---|---|---|---|---|---|
| | x | y | a | b | c | Comp. | Parts by weight | | | ε r | Q (3 GHz) | τ f (ppm/°C.) |
| *49 | 4.0 | 0.75 | 0 | 0 | 0 | J | 2.0 | 0.00 | 900 | 21 | 700 | −4 |
| 50 | 4.0 | 0.75 | 0 | 0 | 0 | K | 2.0 | 0.18 | 900 | 30 | 4100 | 2 |
| 51 | 4.0 | 0.75 | 0 | 0 | 0 | L | 2.0 | 0.32 | 900 | 32 | 4400 | 3 |
| 52 | 4.0 | 1.0 | 0 | 0 | 0 | E | 2.0 | 0.58 | 900 | 32 | 3800 | 21 |
| 53 | 4.5 | 1.5 | 0 | 0 | 0 | A | 2.0 | 0.22 | 900 | 31 | 3200 | 5 |
| 54 | 4.5 | 1.5 | 0 | 0 | 0 | C | 2.0 | 0.50 | 900 | 33 | 5800 | 30 |
| 55 | 4.5 | 1.5 | 0 | 0 | 0 | E | 2.0 | 0.58 | 900 | 33 | 6900 | 32 |
| 56 | 4.5 | 1.5 | 0 | 0 | 0 | F | 2.0 | 0.80 | 900 | 35 | 4800 | 37 |
| 57 | 4.5 | 1.5 | 0 | 0 | 0 | G | 2.0 | 0.66 | 900 | 34 | 3600 | 17 |
| 58 | 4.5 | 1.5 | 0 | 0 | 0 | H | 2.0 | 0.76 | 900 | 34 | 3500 | 16 |
| 59 | 4.5 | 1.5 | 0 | 0 | 0 | I | 2.0 | 0.38 | 900 | 32 | 2700 | 20 |

* : comparative example
Main ceramic composition: (1-a-b) BaO.aSrO.bCaO.x[(1-c) TiO$_2$.cZrO$_2$].yZnO It is recognized from the results of the above measurement on specimens Nos. 12–17 as indicated in TABLE 4 that the temperature coefficient of the resonance frequency is undesirably increased when x, which represents the ratio of titanium oxide to barium oxide in the main ceramic composition, is equal to 3.0 or smaller, or equal to 5.5 or larger. It is apparent from the result of the measurement on specimens Nos. 18–22 which indicate the effect of zinc oxide in the main ceramic composition that the temperature coefficient of the resonance frequency goes excessively negative when y ≧ 3.0. It is also recognized from the evaluation on specimens Nos. 30-35 as indicated in TABLE 5 that the dielectric constant can be improved when a portion of the barium oxide is substituted by strontium oxide and/or calcium oxide. When the substituting proportion (a+b) exceeds 0.4 as in comparative example No. 34, however, the temperature coefficient of the resonance frequency goes excessively positive, and the unloaded Q is undesirably reduced. It is further recognized from the measurement results of specimens Nos. 36 and 37 that the temperature coefficient of the resonance frequency can be reduced when titanium oxide is partially substituted by zirconia. When the titanium oxide and barium oxide are partially substituted at the same time as in specimens No. 38–40, the unloaded Q is reduced when c (substituting amount of ZrO$_2$) is larger than 0.2, as is understood from comparative example No. 40.

It is understood from the measurement results of specimens Nos. 23–29, 41, 42 and 53–56 which indicate the effect of ZnO-B$_2$O$_3$-SiO$_2$ glasses having respective compositions as indicated in TABLE 2 that the ZnO-B$_2$O$_3$-SiO glass effectively serves as the secondary component containing boric oxide. It is also understood from the measurement results of specimens Nos. 43 and 59 which indicate the effect of SiO$_2$-B$_2$O$_3$ glasses on the resultant dielectric ceramics that the SiO$_2$-B$_2$O$_3$ glass effectively serves as the secondary component containing boric oxide. Upon evaluation on the dielectric properties of specimens Nos. 50, 51 which use PbO-SiO$_2$-B$_2$O$_3$ glasses (K, L) as the secondary component, in comparison with those of specimen No. 49 which uses as the secondary component a glass (J) which does not contain boric oxide, it will be understood that the firing temperature cannot be effectively reduced when the secondary component does not contain the boric oxide. Thus, the glass not containing the boric oxide does not serve effectively as the secondary component. It is further recognized from the measurement result of specimen No. 52 which was obtained by adding a ZnO-B$_2$O$_3$-SiO$_2$ glass to a mixture of materials giving the main ceramic composition and calcining the glass and main ceramic composition at the same time, that the resultant dielectric ceramic is satisfactory for practical use even though the unloaded Q is reduced as compared with when the glass is added to a calcined powder of the main ceramic composition.

EXAMPLE 3

100 parts by weight of the calcined powder of the main ceramic composition and 2 parts by weight of a powder of $ZnO$-$B_2O_3$-$SiO_2$ glass (D), which were prepared for specimen No. 18 in EXAMPLE 2, were wet-blended for 64 hours in a polyethylene pot mill using zirconia balls having a diameter of 5 mm, with polyvinyl butyral, a plasticizer and a peptizing agent, within a mixed solution of toluene and isopropyl alcohol.

The thus prepared mixture was degassed, and formed by a doctor blade technique into green tapes each having a thickness of 250 μm. Then, a conductor pattern for a 1800 MHz 2-resonator interdigital bandpass filter was printed on one of the thus formed green tapes, by using an Ag paste suited for printing. Thereafter, 12 sheets of the green tapes, including as an intermediate sheet the above-indicated one tape on which the conductor pattern was printed, were laminated at 100 kgf/cm² at 100° C. The laminated green tapes were cut into segments, and then fired in air for two hours at 900° C., to thereby provide stripline type filters as illustrated in FIG. 1.

In the stripline type filter as shown in FIG. 1, dielectric substrate 16 has a three-layered structure, which is integrated when co-fired with internal conductors. More specifically, a plurality of resonator electrodes 12, 12 are incorporated in one of the three layers of the dielectric substrate 16, and a pair of coupling electrodes 20, 20 are incorporated in another layer of the substrate 16. The instant filter also includes an earth electrode 14 which covers substantially the entire area of the outer surface of the dielectric substrate 16, and input and output contacts 18, 18 provided on a pair of opposite side surfaces of the substrate 16 without being connected to the earth electrode 14. The coupling electrodes 20, 20 are formed with respective extensions 20a, 20a whose ends are exposed on the above-indicated side surfaces of the dielectric substrate 16, for connection with the input and output contacts 18, 18, respectively.

Upon measurement of the filter characteristics by means of a network analyzer, the thus obtained stripline type filter exhibited a center frequency of 1800 MHz, and an insertion loss of 2.0 dB.

It will be understood from the above description that the present dielectric ceramic composition is obtained by adding a suitable amount of a $B_2O_3$ powder or a glass powder containing $B_2O_3$ as a secondary component, to a main ceramic composition which contains barium oxide (BaO) and titanium oxide ($TiO_2$) as major components, or BaO, $TiO_2$, and at least one of strontium oxide (SrO), calcium oxide (CaO), zirconia ($ZrO_2$) and zinc oxide (ZnO) as major components, in respective specified amounts. The thus obtained dielectric ceramic composition can be fired at a temperature of 1100° C. or lower, preferably at 1000° C. or lower, more preferably at around 900° C. Accordingly, the dielectric ceramics obtained from the dielectric ceramic composition is advantageously used for producing a dielectric filter, such as a stripline type filter, which incorporates internal conductive layers formed solely of Ag or Cu having a relatively low conductivity resistance, or of alloys containing Ag or Cu as a major component. Further, the dielectric ceramics exhibit a sufficiently high specific dielectric constant, a sufficiently large unloaded Q and a significantly reduced temperature coefficient of the resonance frequency.

What is claimed is:

1. A dielectric resonator for microwave application or a dielectric filter comprising a plurality of dielectric resonators, comprising:

a dielectric ceramic obtained by firing a dielectric ceramic composition consisting essentially of a main ceramic composition comprising a major components barium oxide and titanium oxide, or barium oxide, titanium oxide and at least one of strontium oxide, calcium oxide, zirconia and the zinc oxide, which composition is represented by $(1-a-b)BaO.aSrO.bCaO.x[(1-c)TiO_2.cZrO_2].yZnO$, wherein $3.1 \leq x = 5.4$, $0 \leq y \leq 2.9$, $0 \leq a+b \leq 0.4$, $0 \leq c \leq 0.2$; and a secondary component at least a part of which consists of a $B_2O_3$ material or a glass material containing $B_2O_3$ as one of glass components, said secondary component being added to said main ceramic composition in an amount of 0.1–7.5 parts by weight of $B_2O_3$ per 100 parts by weight of said main ceramic composition; and a conductor pattern which is formed by co-firing with said dielectric ceramic so that said conductor pattern is incorporated in said dielectric ceramic, said conductor pattern being formed of a material selected from the group consisting of Ag, Cu, an alloy containing Ag as a major component, and an alloy containing Cu as a major component.

2. A method of producing a dielectric resonator for microwave application or a dielectric filter comprising a plurality of dielectric resonators, said dielectric resonator comprising a dielectric ceramic, and a conductor pattern incorporated in the dielectric ceramic, said method comprising the steps of:

preparing a green sheet or calcined body made of a dielectric ceramic composition which gives said dielectric ceramic, said dielectric ceramic composition consisting essentially of a main ceramic composition comprising as major components barium oxide and titanium oxide, or barium oxide, titanium oxide and at least one of strontium oxide, calcium oxide, zirconia and zinc oxide, which composition is represented by $(1-a-b)BaO.aSrO.bCaO.x[(1-c)TiO_2.cZrO_2].yZnO$, where $3.1 \leq x \leq 5.4$, $0 \leq y \leq 2.9$, $0 \leq a+b \leq 0.4$, $0 \leq c \leq 0.2$; and a secondary component at least a part of which consists of a $B_2O_3$ material or a glass material containing $B_2O_3$ as one of glass components, said secondary component being added to said main ceramic composition in an amount of 0.1–7.5 parts by weight of $B_2O_3$ per 100 parts by weight of said main ceramic composition;

forming at least one conductive layer which gives said conductor pattern, on said green sheet or calcined body, said at least one conductive layer being formed of a material selected from the group consisting of Ag, Cu, an alloy containing Ag as a major component, and an alloy containing Cu as a major component; and co-firing said green sheet of calcined body of the dielectric ceramic composition with said at least one conductive layer.

* * * * *